US007246230B2

(12) United States Patent
Stanko

(10) Patent No.: US 7,246,230 B2
(45) Date of Patent: Jul. 17, 2007

(54) SINGLE SIGN-ON OVER THE INTERNET USING PUBLIC-KEY CRYPTOGRAPHY

(75) Inventor: Joseph A. Stanko, El Cerrito, CA (US)

(73) Assignee: BEA Systems, Inc., San Jose, CA (US)

( * ) Notice: Subject to any disclaimer, the term of this patent is extended or adjusted under 35 U.S.C. 154(b) by 803 days.

(21) Appl. No.: 10/059,460

(22) Filed: Jan. 29, 2002

(65) Prior Publication Data

US 2005/0074126 A1    Apr. 7, 2005

(51) Int. Cl.
H04L 9/00 (2006.01)
G06F 15/16 (2006.01)
G06F 7/04 (2006.01)
(52) U.S. Cl. .................. 713/155; 713/159; 709/229; 726/5; 726/10
(58) Field of Classification Search ........... 713/155, 713/159, 150; 709/229; 726/5, 10
See application file for complete search history.

(56) References Cited

U.S. PATENT DOCUMENTS

| 5,241,594 | A | 8/1993 | Kung |
|---|---|---|---|
| 5,444,850 | A | 8/1995 | Chang |
| 5,493,614 | A | 2/1996 | Chaum |
| 5,657,388 | A | 8/1997 | Weiss |
| 5,680,547 | A | 10/1997 | Chang |
| 5,684,950 | A | 11/1997 | Dare et al. |
| 5,754,755 | A | 5/1998 | Smith, Jr. |
| 5,768,503 | A | 6/1998 | Olkin |
| 5,768,504 | A | 6/1998 | Kells et al. |
| 5,781,724 | A | 7/1998 | Nevarez et al. |
| 5,819,271 | A | 10/1998 | Mahoney et al. |
| 5,894,554 | A | 4/1999 | Lowery et al. |
| 5,907,837 | A | 5/1999 | Ferrel et al. |
| 5,935,251 | A | 8/1999 | Moore |
| 5,944,824 | A | 8/1999 | He |
| 5,974,445 | A | 10/1999 | Pivnichny et al. |
| 6,014,137 | A | 1/2000 | Burns |
| 6,014,638 | A | 1/2000 | Burge et al. |
| 6,026,433 | A | 2/2000 | D'Arlach et al. |
| 6,065,120 | A | 5/2000 | Laursen et al. |
| 6,085,030 | A | 7/2000 | Whitehead et al. |

(Continued)

OTHER PUBLICATIONS

Medvinsky, A., et al., "Public Key Utilizing Tickets for Application Servers (PKTAPP)", Mar. 1998, http://www.ietf.org/internet-drafts/draft-ietf-cat-kerberos-pk-tapp-03.txt, pp. 1-6.*

(Continued)

*Primary Examiner*—Emmanuel L. Moise
*Assistant Examiner*—Courtney D Fields
(74) *Attorney, Agent, or Firm*—Jackson & Co., LLP; Andrew V. Smith

(57) ABSTRACT

A computer program product, apparatus, and method for use in an authentication server for obtaining access to a secure server for a client that has issued a request for access to the secure server, without further intervention by the user of the client, includes receiving an authentication challenge sent by the secure server to the client; and generating a ticket having a digital signature applied using a private key of the authentication server; and wherein the secure server, upon receiving the ticket and verifying the digital signature using a public key corresponding to the private key of the authentication server, grants access to the client.

64 Claims, 8 Drawing Sheets

U.S. PATENT DOCUMENTS

| | | | |
|---|---|---|---|
| 6,085,168 | A | 7/2000 | Mori et al. |
| 6,112,192 | A | 8/2000 | Capek et al. |
| 6,128,663 | A | 10/2000 | Thomas |
| 6,134,548 | A | 10/2000 | Gottsman et al. |
| 6,134,658 | A | 10/2000 | Multerer et al. |
| 6,158,007 | A | 12/2000 | Moreh et al. |
| 6,158,010 | A | 12/2000 | Moriconi et al. |
| 6,161,126 | A | 12/2000 | Wies et al. |
| 6,178,511 | B1 | 1/2001 | Cohen et al. |
| 6,185,316 | B1 | 2/2001 | Buffam |
| 6,185,614 | B1 | 2/2001 | Cuomo et al. |
| 6,240,512 | B1 | 5/2001 | Fang et al. |
| 6,243,816 | B1 | 6/2001 | Fang et al. |
| 6,256,737 | B1 | 7/2001 | Bianco et al. |
| 6,275,941 | B1 | 8/2001 | Saito et al. |
| 6,275,944 | B1 | 8/2001 | Kao et al. |
| 6,317,838 | B1 | 11/2001 | Baize |
| 6,327,628 | B1 | 12/2001 | Anuff et al. |
| 6,327,659 | B2 | 12/2001 | Boroditsky et al. |
| 6,332,192 | B1 | 12/2001 | Boroditsky et al. |
| 6,405,219 | B2 | 6/2002 | Saether et al. |
| 6,460,141 | B1 | 10/2002 | Olden |
| 6,473,802 | B2 | 10/2002 | Masters |
| 6,532,451 | B1 | 3/2003 | Schell et al. |
| 6,539,382 | B1 | 3/2003 | Byrne et al. |
| 6,556,995 | B1 | 4/2003 | Child et al. |
| 6,557,039 | B1 | 4/2003 | Leong et al. |
| 6,609,198 | B1 | 8/2003 | Wood et al. |
| 6,629,246 | B1 | 9/2003 | Gadi |
| 6,651,168 | B1 | 11/2003 | Kao et al. |
| 6,668,322 | B1 | 12/2003 | Wood et al. |
| 6,691,232 | B1 | 2/2004 | Wood et al. |
| 6,704,873 | B1 | 3/2004 | Underwood |
| 6,735,310 | B1 | 5/2004 | Hsing et al. |
| 6,801,946 | B1 | 10/2004 | Child et al. |
| 6,807,577 | B1 | 10/2004 | Gillespie et al. |
| 6,812,938 | B2 | 11/2004 | Pinnell |
| 6,826,692 | B1 | 11/2004 | White |
| 6,826,696 | B1 * | 11/2004 | Chawla et al. ............. 713/201 |
| 6,826,698 | B1 | 11/2004 | Minkin et al. |
| 6,836,845 | B1 | 12/2004 | Lennie et al. |
| 6,892,307 | B1 | 5/2005 | Wood et al. |
| 6,898,577 | B1 | 5/2005 | Johnson |
| 6,938,158 | B2 | 8/2005 | Azuma |
| 6,954,736 | B2 | 10/2005 | Menninger et al. |
| 6,954,792 | B2 | 10/2005 | Kang et al. |
| 6,954,799 | B2 | 10/2005 | Lerner |
| 6,961,776 | B1 | 11/2005 | Buckingham et al. |
| 6,971,005 | B1 | 11/2005 | Henry et al. |
| 2001/0044894 | A1 | 11/2001 | Saito et al. |
| 2002/0094090 | A1 * | 7/2002 | Iino ........................... 380/282 |
| 2003/0172090 | A1 * | 9/2003 | Asunmaa et al. ........... 707/200 |
| 2003/0172269 | A1 * | 9/2003 | Newcombe ................. 713/168 |
| 2004/0078571 | A1 * | 4/2004 | Haverinen .................. 713/168 |

OTHER PUBLICATIONS

Kerberos Papers and Documentation, http://web.mit.edu/kerberos/www/papers.html.

T. Dierks, et al., The TLS Protocol Version 1.0, http://www.ietf.org/rfc/rfc2246.txt.

Microsoft Passport Technical White Paper, Mar. 2001, http://www.passport.com/downloads/TechnicalWhitePaper.doc.

Netegrity SiteMinder® 5.0, http://www.netegrity.com/products/index.cfm?leveltwo=SiteMinder.

IBM Tivoli Access Manager for Business Integration, http://www.tivoli.com/products/index/access-mgr-bus-integration.

IBM Tivoli Access Manager for e-business, http://www.tivoli.com/products/index/access-mgr-e-bus.

IBM Tivoli Access Manager for Operating Systems, http://www.tivoli.com/products/index/access-mgr-operating-sys.

Oblix NetPoint™ Product Description, http://www.oblix.com/products/netpoint/net_description.html.

RSA ClearTrust Web Access Management for Secure e-Business, http://www.rsasecurity.com/products/cleartrust.

Baltimore SelectAccess Introducing SelectAccess 5.0, http://www.baltimore.com/selectaccess/index.asp.

O'Mahony et al., "Electronic Payment Systems," 1977, pp. 226-227, ISBN 0-89006-925, Artech House, Inc., US.

O'Mahony et. al, "Electronic Payment Systems," 1997, pp. 221-228, Artech House, Inc., US.

Vipin Samar, Single Sign-On Using Cookies for Web Applications, 1999, Enabling Technologies: Infrastructure for Collaborative Enterprises, 1999. (Wet Ice '99) Proceedings. IEEE 8th International Workshops On, vol. Iss., 1999, pp. 158-163.

Andrej Volchkov, Revisiting Single Sign-On: A Approach in a New Context, IT Professional, vol. 3, Iss. 1., Jan./Feb. 2001, pp. 39-45.

Phillip Carden, The New Face of Single Sing-On, Network Computing, Mar. 22, 1999.

U.S. Appl. No. 10/004,301 to Frey et al.

Hsu, et al., WebSphere and Domino Single Sign-on, Jan. 2001, IBM, http://www.-128.ibm.com/developerworks/ibm/library/it-0101art2/, accessed Jan. 17, 2006.

IBM, IBM Global Sign-on for Multiplatforms, Version 1.5: A Secure Single Sign-on Solution Updated for AIX, Windows NT, and Sun Solaris, Jan. 1998.

IBM, Secured Single Signon in a client/server environment, Aug. 1994, <http://www.redbooks.ibm.com/abstracts/gg244282.html>.

Rodriguez, et al., An Introduction to IBM WebSphere Everyplace Suite Version 1.1 Accessing Web and Enterprise Applications, Oct. 2000, IBM Redbooks, http://www.redbooks.ibm.com/redbooks/pdfs/sg245995.pdf, accessed Jan. 17, 2006.

Method for Providing Personalized Information on the Web, IBM TDB, Oct. 1997, vol. 40, No. 10, pp. 3-6.

* cited by examiner

SINGLE SIGN-ON OVER THE INTERNET USING PUBLIC-KEY CRYPTOGRAPHY

BACKGROUND

This disclosure relates generally to information retrieval and distribution systems. More specifically, it relates to single sign-on over the Internet using public-key cryptography.

It is common for today's enterprise networks to comprise scattered arrangements of different hardware and software systems. This is due to the ever-changing data management needs of corporate enterprises, and to continuing advances in the computing hardware and software available to meet those needs. Commonly, different entities within an enterprise (for example, different departments or work sites) have disparate software applications, groupware systems, or data maintenance architectures/procedures, such that information created or maintained by one entity is not usable by another entity.

Corporate portals, also referred to as intranet portals, have been introduced to increase the accessibility and usability of information stored across the heterogeneous systems of an enterprise network. A corporate portal, which is usually overlaid onto an existing enterprise network, is designed to extract content from disparate systems on the enterprise network and to allow easier, personalized access to that content by end users. It is to be appreciated that while the features and advantages of the implementations described herein are particularly advantageous for corporate portal environments, enhancing their speed, openness, scalability, and stability, the features and advantages of the implementations are also applicable in other environments, such as with personalized "Web portals" that serve broad user bases. By way of example and not by way of limitation, one example of a corporate portal is the Plumtree Corporate Portal available from Plumtree Software, Inc. of San Francisco, Calif., while examples of personalized Web portals are typified by the MyYahoo! resource from Yahoo, Inc. of Sunnyvale, Calif. and MyExcite from At Home Corp. of Redwood City, Calif. Corporate portals are also described in commonly assigned U.S. Ser. No. 09/896,039, filed Jun. 29, 2001, which is incorporated by reference herein.

FIG. 1 shows a simplified view of an exemplary user screen 102 associated with a corporate portal system, comprising a plurality of content components 104-110. A content component refers to any content that is assembled, along with other content components, into a unified body of content. In the example of FIG. 1, a company news content component 104 includes an HTML display of news that is extracted, for example, from one or more company news servers, and arranged for display to the end user. A company stock quote content component 106 comprises an HTML display of a stock quote for the company and its competition that is extracted, for example, from a stock quote server. Also shown in FIG. 1 is an email content component 108 and a customer relationship management (CRM) content component 110. According to the end user's ID 112, the corporate portal displays the content components 104-110 in a personalized arrangement (for example, news at the upper left, company stock quote in the upper right, and so on) and also selects the information within each content component based on the user's ID (for example, showing the user's personal e-mail account only, showing sports news on top of world news, showing only the user's personal CRM information, and so on). The user screen 102 of FIG. 1 would typically appear after the user (Jane Smith) has logged into the corporate portal system by supplying a user name and password.

More generally, the content components themselves can be any information communicable via any generic application-layer network protocol such as Hypertext Transfer Protocol (HTTP), Secure Hypertext Transfer Protocol (HTTPS), File Transfer Protocol (FTP), Wireless Application Protocol (WAP), or the like. Information communicable via a network includes text information, image information, Extensible Markup Language (XML), Hypertext Markup Language (HTML), or any other type of information that can be stored in a computer file, including images, sounds, and video. Throughout this specification we refer to any information sent over a network as content. We use the term content component to refer to any content that is assembled, along with other content components, into a unified body of content.

An exemplary content component is the HTML output generated by a script that communicates with an email client application. An email client application sends and receives email. Such applications usually let users compose email, and store email addresses in an address book. This script provides an HTML interface to the email client application. This script is hosted by the computer hosting the email application. This script generates HTML displaying the user's email messages, along with HTML allowing the user to compose and send email messages. This script can communicate with the email application through the application's programming interface. In this example, the HTML generated by the script is the content component (see, for example, FIG. 1, content component 108).

Other exemplary content components are two types of HTML generated by a program that communicates with a database application. This program can be hosted by the same computer hosting the database application. The database application stores and maintains a database of information organized into records. This program can communicate with the database application via the application's interface. This program generates HTML that allows the user to search for database records. For this case, the content component is a query box. This program also generates HTML that displays database records to the user. For this case, the content component is a view of the database records (see, for example, FIG. 1, content component 110). Further examples of content components include, but are not limited to, resources generated by a calendar application, a workflow application, a database storing proprietary personal information, a database storing proprietary business information, a database storing secure personal information, a database storing secure business information, an e-business application, or the like.

Content components are obtained from servers referred to herein as "resource servers." In some cases, resource servers may be secure, so that security credentials are required to gain access to the content on a secure resource server, also referred to herein as a "secure server."

A server such as a corporate portal maintains a list of the types of content available from the resource servers, and advertises these types of content to users. Users employ user terminals, also referred to herein as "clients," to access the portal server over a network such as the Internet. A user establishes personalized settings in part by selecting certain of the types of content that are advertised by the portal server. Subsequent to this personalization step, the user sends a request for personalized content to the portal server. The personalized content can include content residing upon secure resource servers. Therefore, the portal server must provide security credentials to each secure resource server.

According to one prior art method the portal server simply forces the user to supply a security credential every time a secure resource server requires one. Since remembering multiple passwords or authentication methods is difficult for many users, users often write down or forget passwords, or use the same password for all of the secure resource servers. These user reactions create potential security and management problems.

According to another prior art method the portal server collects and stores the user security credentials for all of the secure resource servers. Whenever a secure resource server requires a security credential, the portal server simply provides all of the user's security credentials to the secure resource server. While relieving the user from entering his security credentials again and again, this technique creates significant security risks. For example, one of the secure resource servers could access another of the secure resource servers by spoofing the user.

To overcome these deficiencies in the prior art, techniques referred to as "Single-Sign-On" (SSO) have recently been developed. SSO techniques allow a user to access computers and systems to which he has permission through a single action, without the need to enter multiple passwords. One such technique is Kerberos, which allows a user to delegate authentication functions to another entity, such as the portal server. One significant disadvantage of kerberos is that it does not support generic application-layer protocols, such as hypertext transfer protocol (HTTP) or file transfer protocol (FTP). Therefore a user cannot use Kerberos through a standard Web browser, such as Microsoft Internet Explorer or Netscape Navigator, without significant modification to the browser. Also, Kerberos relies on the secure distribution of "shared secrets," meaning that each principal must share a secret key with the Key Distribution Center. This requirement greatly increases the costs of administration, especially across organizational boundaries.

Some commercially-available off-the-shelf SSO products, such as Netegrity Siteminder and Securant Cleartrust, employ HTTP as the application-layer protocol, and so are compatible with unmodified browsers. When a user first visits a Web site employing this type of SSO product, the Web site authenticates the user and then gives the user browser a token, such as a session cookie, that allows the user to access any other Web site that is guarded by the same SSO product without going through the original Web site or authenticating again.

Another prior art solution is Microsoft Passport, which provides a single authenticator, controlled by Microsoft. According to Passport, the secure resource server shares a secret key with the Microsoft Passport Authenticator. One disadvantage of Passport is that, in order to share a private key with the Microsoft Passport Authenticator, each secure resource server must enter a business relationship with Microsoft.

Another prior art solution is represented by the capability of some browsers to store a security credential required by a Web site, and to forward the security credential to the Web site automatically when the user directs the browser to that Web site. Such security credentials can include session cookies, persistent cookies, and digital certificates. One disadvantage of this approach is that it is not portable. In order to use this approach on a second computer, the user must install the credentials on that computer as well. In addition, if the second computer is available to other users, the credentials must be removed when the session ends to prevent a security breach.

SUMMARY

In general, in one aspect, the invention features a computer program product, apparatus, and method for use in an authentication server for obtaining access to a secure server for a client that has issued a request for access to the secure server, without further intervention by the user of the client. It includes receiving an authentication challenge sent by the secure server to the client; and generating a ticket having a digital signature applied using a private key of the authentication server; and wherein the secure server, upon receiving the ticket and verifying the digital signature using a public key corresponding to the private key of the authentication server, grants access to the client.

Particular implementations can include one or more of the following features. Implementations can include authenticating the client based on a previous successful authentication of the client before generating the ticket. Authenticating includes receiving a ticket-granting ticket from the client, the ticket-granting ticket previously sent to the client by the authentication server after a successful authentication of the client in which the client supplied a security credential. Implementations can include receiving the security credential from the client, the security credential belonging to a user of the client; verifying the security credential; and generating the ticket-granting ticket when the verification is successful.

In general, in one aspect, the invention features a computer program product, apparatus, and method for use in a secure server for granting access to the secure server, in response to a request from a client for access to the secure server, without further intervention by the user of the client. It includes sending an authentication challenge to the client, the authentication challenge including the identity of an authentication server trusted by the secure server, wherein the client sends the authentication challenge to the authentication server without intervention by the user; receiving a ticket having a digital signature applied using a private key of the authentication server; verifying the digital signature using a public key corresponding to the private key of the authentication server; and granting access to the client upon verifying at least a portion of the ticket.

In particular implementations the portion includes at least a part of the authentication challenge, and granting includes verifying the part of the authentication challenge received in the ticket before granting access to the client.

In general, in one aspect, the invention features a computer program product, apparatus, and method for use in a Web server for obtaining content from a secure server, in response to a request from a client for the content, without further intervention by the user of the client. It includes sending a request for the content to the secure server; receiving an authentication challenge from the secure server in response to the request; sending a forwardable ticket to an authentication server trusted by the secure server, the forwardable ticket previously sent to the Web server by the authentication server based on a successful authentication of the client by the authentication server; receiving from the authentication server a ticket having a digital signature applied using a private key of the authentication server; and sending the ticket to the secure server, wherein the secure server, upon verifying the digital signature using a public key corresponding to the private key of the authentication server, provides the requested content; and wherein all communications with the client employ a generic application-layer network protocol.

Particular implementations can include sending a forwardable challenge to the client in response to the request from the client, the forwardable challenge including the identity of an authentication server trusted by the Web server, wherein the authentication server authenticates the client and generates the forwardable ticket based on authenticating the client; and receiving the forwardable ticket from the authentication server.

In general, in one aspect, the invention features a computer program product, apparatus, and method for use in an authentication server for obtaining content from a secure server for a client that has issued a request for the content from the secure server, without further intervention by the user of the client. It includes receiving a forwardable ticket sent by a Web server in response to a challenge issued by the secure server in response to the request, the forwardable ticket previously sent to the Web server by the authentication server based on a successful authentication of the client by the authentication server; generating a ticket having a digital signature applied using a private key of the authentication server; and wherein the secure server, upon verifying the digital signature using a public key corresponding to the private key of the authentication server, provides the requested content; and wherein all communications with the client employ a generic application-layer network protocol.

Particular implementations can include one or more of the following features. Implementations can include authenticating the client based on a previous successful authentication of the client before generating the ticket. Authenticating can include verifying the forwardable ticket. Implementations can include receiving a security credential from the client, the security credential belonging to a user of the client; verifying the security credential; and generating the forwardable ticket when verifying the client is successful. Implementations can include receiving a ticket-granting ticket from the client, the ticket-granting ticket sent by a second authentication server to the client based on the previous successful authentication; generating the forwardable ticket; and sending the forwardable ticket to the client, whereupon the client sends the forwardable ticket to the Web server. Implementations can include receiving a security credential from the client, the security credential belonging to a user of the client; verifying the security credential; and generating the ticket-granting ticket when the verification is successful.

In general, in one aspect, the invention features a computer program product, apparatus, and method for use in a secure server for providing content hosted by the secure server to a client in response to a request for the content sent from the client, without further intervention by the user of the client, the request forwarded by a Web server to the secure server. It includes sending an authentication challenge to the Web server, the authentication challenge including the identity of an authentication server trusted by the secure server, wherein the Web server sends the authentication challenge to the authentication server; receiving a ticket having a digital signature applied using a private key of the authentication server; verifying the digital signature using a public key corresponding to the private key of the authentication server; and providing the requested content to the client upon verifying at least a portion of the ticket.

In particular implementations the portion can include at least a part of the authentication challenge, and implementations can include verifying the part of the authentication challenge received in the ticket before providing the requested content to the client.

In general, in one aspect, the invention features a computer program product, apparatus, and method for use in a Web server for obtaining access to a secure server, in response to a request from a client for the access, without further intervention by the user of the client. It includes sending a request for the content to the secure server; receiving an authentication challenge from the secure server in response to the request; sending a forwardable ticket to an authentication server trusted by the secure server, the forwardable ticket previously sent to the Web server by the authentication server based on a successful authentication of the client by the authentication server; receiving from the authentication server a ticket having a digital signature applied using a private key of the authentication server; and sending the ticket to the secure server, wherein the secure server, upon verifying the digital signature using a public key corresponding to the private key of the authentication server, grants the access; and wherein all communications with the client employ a generic application-layer network protocol.

Particular implementations can include sending a forwardable challenge to the client in response to the request from the client, the forwardable challenge including the identity of an authentication server trusted by the Web server, wherein the authentication server authenticates the client and generates the forwardable ticket based on authenticating the client; and receiving the forwardable ticket from the authentication server.

In general, in one aspect, the invention features a computer program product, apparatus, and method for use in an authentication server for obtaining access to a secure server for a client that has issued a request for the access, without further intervention by the user of the client. It includes receiving a forwardable ticket sent by a Web server in response to a challenge issued by the secure server in response to the request, the forwardable ticket previously sent to the Web server by the authentication server based on a successful authentication of the client by the authentication server; generating a ticket having a digital signature applied using a private key of the authentication server; and wherein the secure server, upon verifying the digital signature using a public key corresponding to the private key of the authentication server, grants the access; and wherein all communications with the client employ a generic application-layer network protocol.

Particular implementations can include one or more of the following features. Implementations can include authenticating the client based on a previous successful authentication of the client before generating the ticket. authenticating includes verifying the forwardable ticket. Implementations can include receiving a security credential from the client, the security credential belonging to a user of the client; verifying the security credential; and generating the forwardable ticket when verifying the client is successful. Implementations can include receiving a ticket-granting ticket from the client, the ticket-granting ticket sent by a second authentication server to the client based on the previous successful authentication; generating the forwardable ticket; and sending the forwardable ticket to the client, whereupon the client sends the forwardable ticket to the Web server. Implementations can include receiving a security credential from the client, the security credential belonging to a user of the client; verifying the security credential; and generating the ticket-granting ticket when the verification is successful.

In general, in one aspect, the invention features a computer program product, apparatus, and method for use in a secure server for granting access to a client in response to a request for the access sent from the client, without further intervention by the user of the client. It includes sending an authentication challenge to the Web server, the authentication challenge including the identity of an authentication server trusted by the secure server, wherein the Web server sends the authentication challenge to the authentication server; receiving a ticket having a digital signature applied using a private key of the authentication server; verifying the digital signature using a public key corresponding to the private key of the authentication server; and ranting the access to the client upon verifying at least a portion of the ticket.

In particular implementations can include one or more of the following features. The portion includes at least a part of the authentication challenge, and implementations can include verifying the part of the authentication challenge received in the ticket before providing the requested content to the client. The details of one or more embodiments of the invention are set forth in the accompanying drawings and the description below. Other features of the invention will be apparent from the description and drawings, and from the claims.

Figure 1:
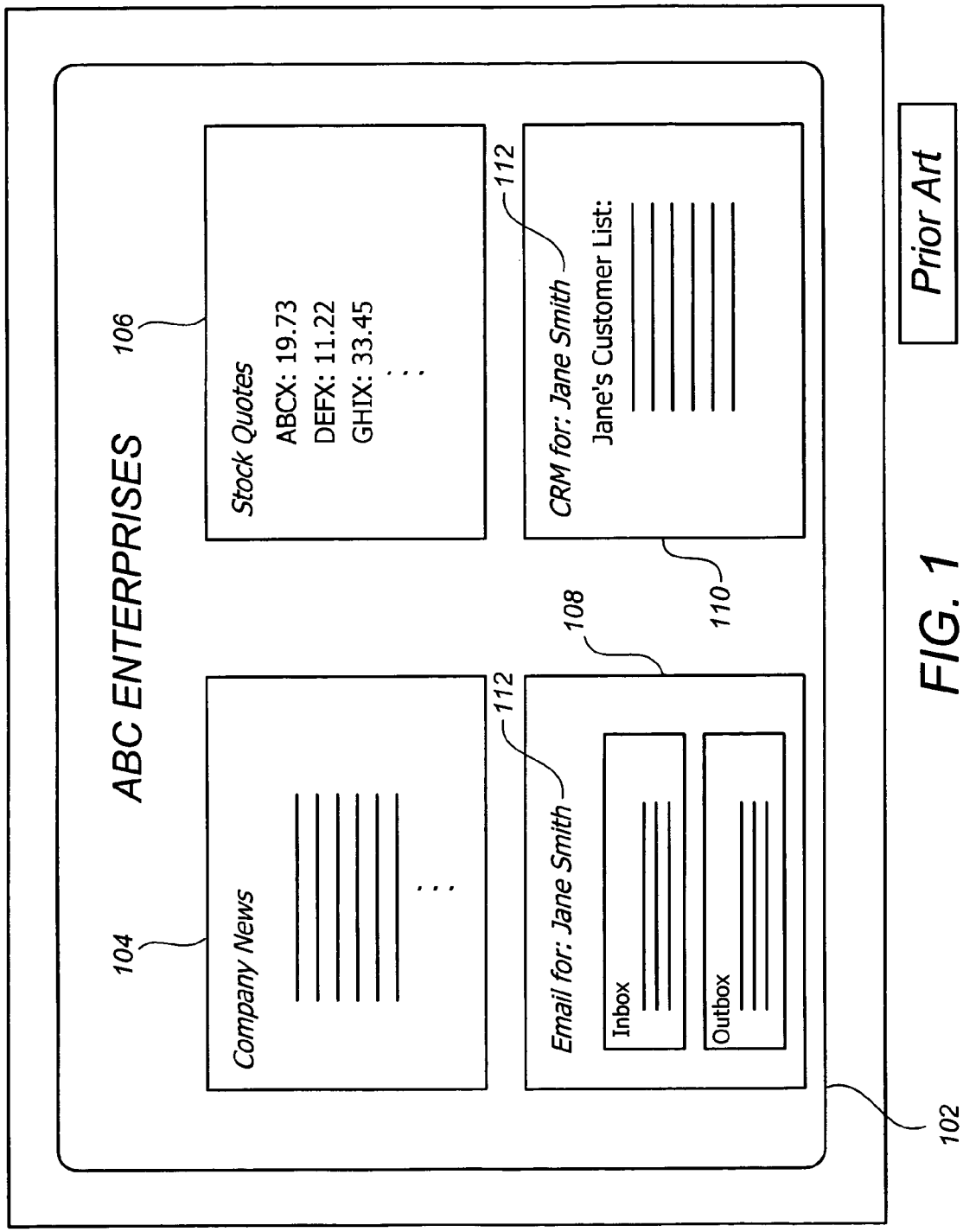
FIG. 1 shows a simplified view of an exemplary user screen associated with a corporate portal system.

The leading digit(s) of each reference numeral used in this specification indicates the number of the figure in which the reference numeral first appears.

DETAILED DESCRIPTION

As used herein, the terms "client" and "server" generally refer to an electronic device or mechanism, and the term "message" generally refers to an electronic signal representing a digital message. As used herein, the term "mechanism" refers to hardware, software, or any combination thereof. These terms are used to simplify the description that follows. The clients, servers, and mechanisms described herein can be implemented on any standard general-purpose computer, or can be implemented as specialized devices.

Figure 2:
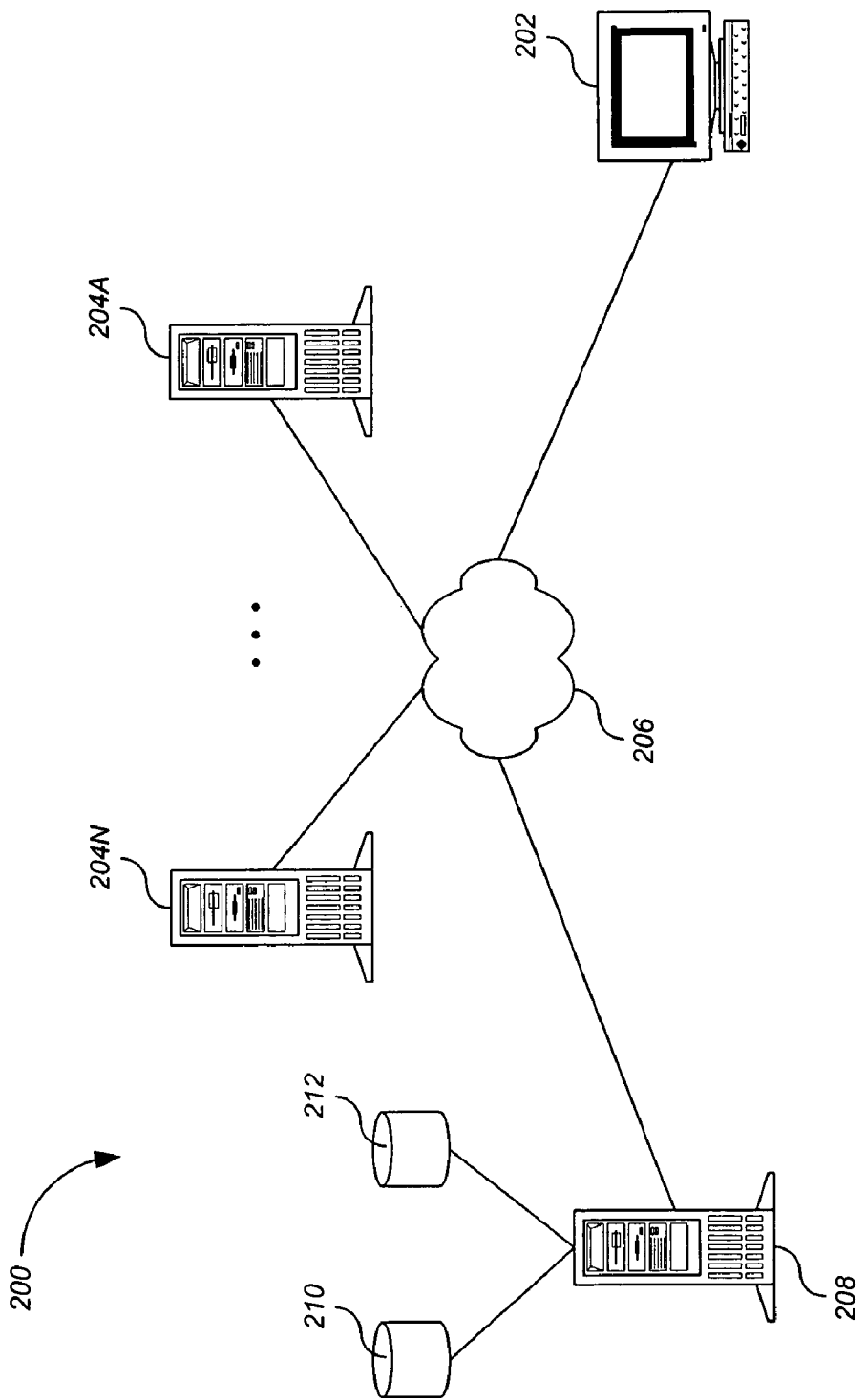
FIG. 2 shows an implementation of an authentication system.

An implementation of an authentication system 200 is described with reference to FIG. 2. A client 202 permits users to access a network 206, such as the Internet, an enterprise network, or any other kind of network or combination of networks. Any number of clients 202 can be connected to network 206. A plurality of secure servers 204A through 204B are connected to network 206. A secure server 204 is referred to as "secure" because it requires that a client 202 be authenticated before access to the secure server 204 is granted to that client 202. Also connected to network 206 is an authentication server 208, which can authenticate clients 202 as required by secure servers 204, and as described in detail below. In one implementation, the connections among the servers and clients are implemented as secure sockets layer (SSL) connections.

A directory 210 and a credentials cache 212 are connected to authentication server 208. Each of directory 210 and credentials cache 212 can be implemented as a database, a table stored in a memory, or the like.

Figure 3:
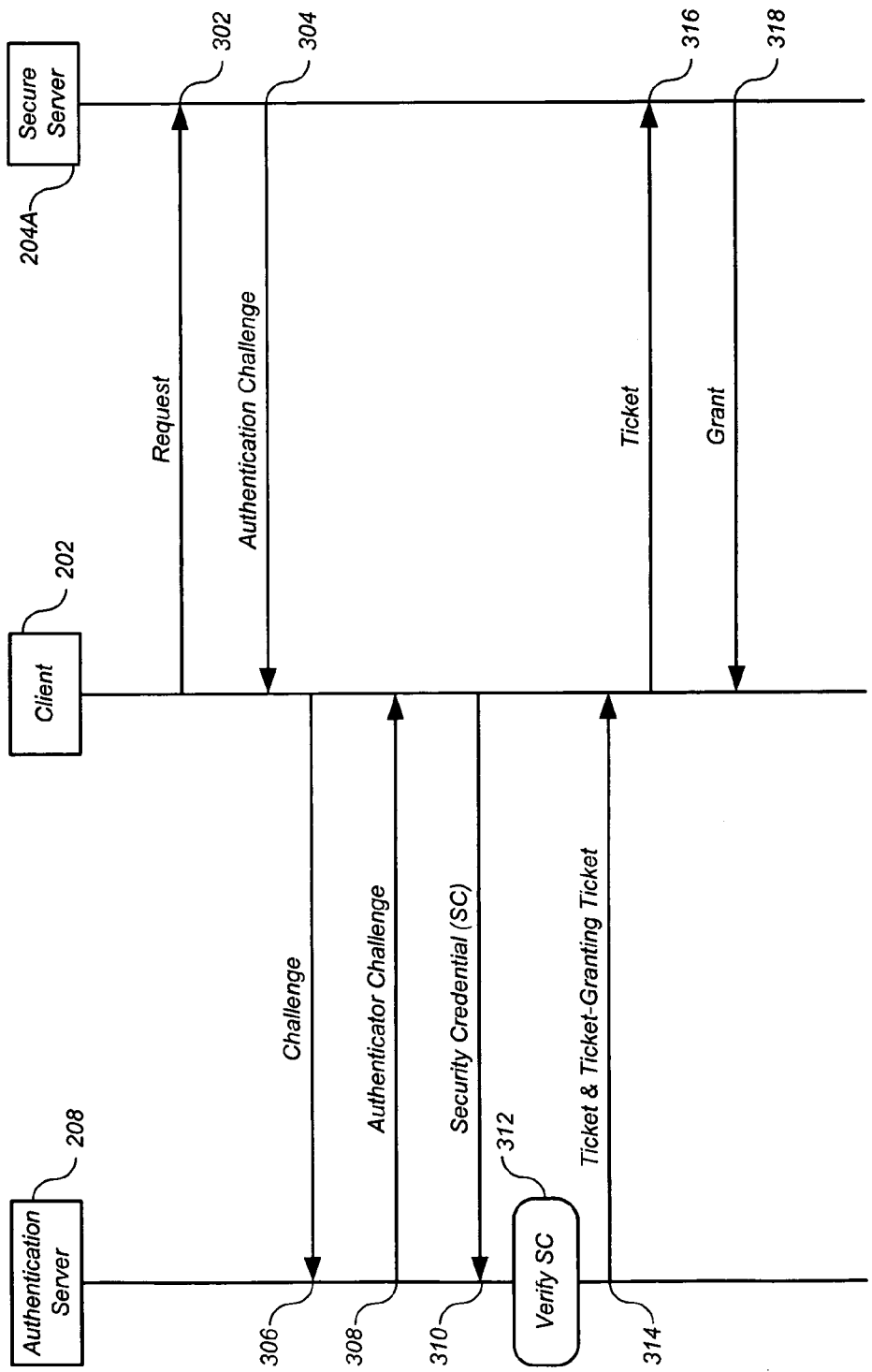
FIG. 3 shows an operation of the authentication system of FIG. 2 where a client is required to provide a security credential of the user to access a secure server.

An operation of authentication system 200 where client 202 is required to provide a security credential of the user to access a secure server 204A is described with reference to FIG. 3. A user of client 202 desires access to data, services, resources, or the like, hosted by a secure server 204A. Therefore the user issues a demand to client 202 for access to secure server 204A. The demand can take the form of a command typed into a keyboard, a click of a mouse, or the like. In response to the demand, client 202 sends a request message (act 302) to secure server 204A requesting access to secure server 204A. In response, secure server 204A sends an authentication challenge message (act 304) to client 202 requesting authentication of client 202.

In one implementation, the authentication challenge includes the current time, the identity of secure server 204A, the internet protocol (IP) address of client 202 as seen from secure server 204A, a random number, and the identity of an authentication server that is trusted by secure server 204A (in this case, the identity of authentication server 208).

Client 202 redirects the authentication challenge to authentication server 208 as a query string, without user intervention (act 306). The redirect is a standard browser operation, as is well-known in the relevant arts. Client 202 also passes its uniform resource locator (URL) in the query string, and if specified by secure server 204A, a maximum timeout for ticket-generating tickets (TGT), discussed below. Authentication server 208 uses whichever timeout is less, the one specified by secure server 204A or an internal one, so that even if authentication server 208 would normally grant TGTs for 6 hours, and only 3 hours have elapsed, the user must present her credentials again if the server principal specifies a 1 hour timeout.

In response, authentication server 208 sends an authenticator challenge message to client 202 (act 308). In response, client 202 sends a security credential message to authentication server 208 (act 310). The security credential message includes at least one security credential belonging to the user of client 202. Authentication server 208 can use any credentials that can be transmitted across HTTP to authenticate client 202, including passwords, challenge-response, digital certificates, tokens, smart cards, or biometrics, or any combination thereof, and can authenticate against any backend directory via lightweight directory access protocol (LDAP), Microsoft Windows NT LAN Manager (NTLM), or another protocol.

Authentication server 208 authenticates client 202 (act 312). Directory 210 contains an entry for each user that is authorized to access secure server 204A. Each entry contains one or more security credentials belonging to each authorized user. Authentication server 208 authenticates client 202 by verifying the security credentials, for example, by comparing the security credential received in the security credential message to the security credentials in directory 210. Upon a successful authentication, authentication server 208 sends a message to client 202 containing a ticket and a ticket-granting ticket (act 314).

The ticket enables client 202 to access secure server 204A automatically. The ticket contains the information from the authentication challenge plus the URL of authentication server 208, a user identifier (ID) unique to authentication server 208, and an expiration date generated by adding a configurable timeout period to the time found in the authentication challenge (to prevent clock synchronization problems). Authentication server 208 also applies a digital signature to the ticket using a private key from a public-private key pair. The challenge and/or the ticket may be too long for reliable support in the query string. If so, the same can be accomplished by other mechanisms such as an automatic form post.

Figure 4:
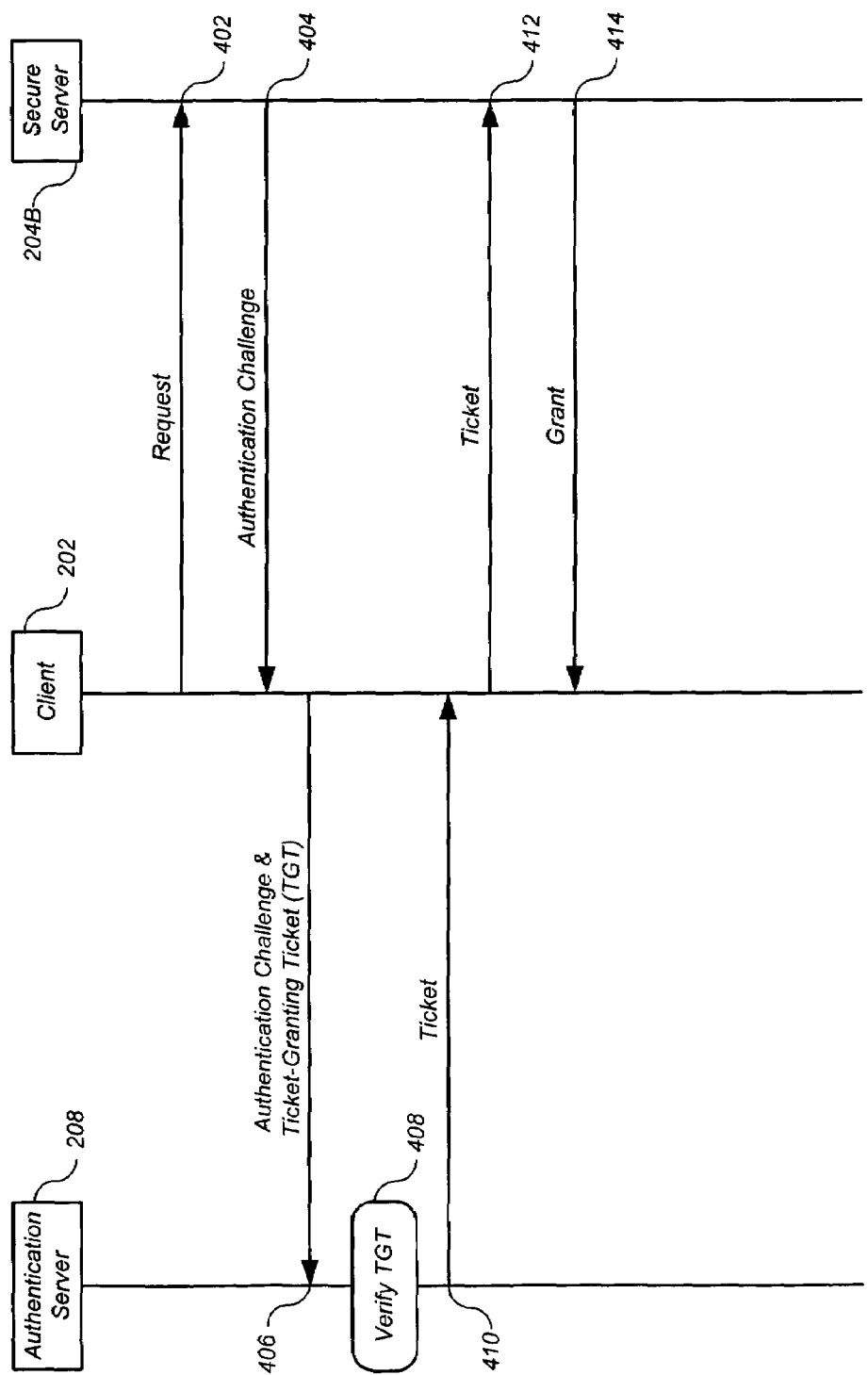
FIG. 4 shows an operation of the authentication system of FIG. 2 where the client accesses a different secure server without again providing a security credential of the user.

The ticket-granting ticket (TGT) enables client 202 to obtain tickets for secure servers other than secure server 204A without again sending security credentials to authentication server 208, as discussed below with respect to FIG. 4. Authentication server 208 also programmatically adds the TGT to its own cookie database.

Client 202 redirects the ticket to secure server 204A without user intervention (act 316). secure server 204A looks up authentication server 208 in a table of trusted authentication servers using the URL of the latter as the key. Finding an entry, secure server 204A retrieves the public key corresponding to the private key used to apply the digital signature to the ticket, uses it to verify the digital signature, and grants access to client 202 (that is, establishes the session). Secure server 204A sends client 202 a grant message (act 318). Secure server 204A can maintain the identity of the client by any of several conventional mechanisms. For example, secure server 204A can choose to store the ticket as a cookie and revalidate it on every request, or can use a traditional session cookie. Preferably SSL is used to prevent session stealing.

In one implementation, the ticket includes at least part of the authentication challenge sent by secure server 204. According to this implementation, secure server 204 verifies the presence of that part of the ticket before granting access to the client.

An operation of authentication system 200 where client 202 accesses a different secure server 204B without again providing a security credential of the user is described with reference to FIG. 4. In this example, this operation follows the operation described with respect to FIG. 3. Client 202 sends a request to a different secure server 204B (act 402), which responds with an authentication challenge (act 404). Client 202 redirects the authentication challenge to authentication server 208, and includes the TGT previously received from authentication server 508, without user intervention (act 406).

Authentication server 208 authenticates client 202 by verifying the TGT (act 408). In one implementation the TGT is a cookie containing a random number which serves as a lookup into credentials cache 212. This cookie can be set as a session cookie or a persistent cookie according to configurable parameters of the authenticator, and is preferably set with the secure flag and the most restrictive path possible such that it is only sent via SSL and only to authentication server 208. In addition, authentication server 208 keeps and enforces its own expiration date within credentials cache 212 regardless of how long client 202 keeps the cookie. When the cookie has expired, authentication server 208 again challenges client 202 to present valid credentials. Authentication server 208 can enforce additional restrictions on the use of the TGT, such as checking that all requests using a particular TGT come from the same IP address.

Authentication server 208 then sends a ticket for secure server 204 to client 202 (act 410) after applying a digital signature to the ticket using a private key of authentication server 208. Client 202 redirects the ticket to secure server 204B without user intervention (act 412). Upon verifying the digital signature, secure server 204 grants access to client 202 by sending a grant message to client 202 (act 414).

Figure 5:
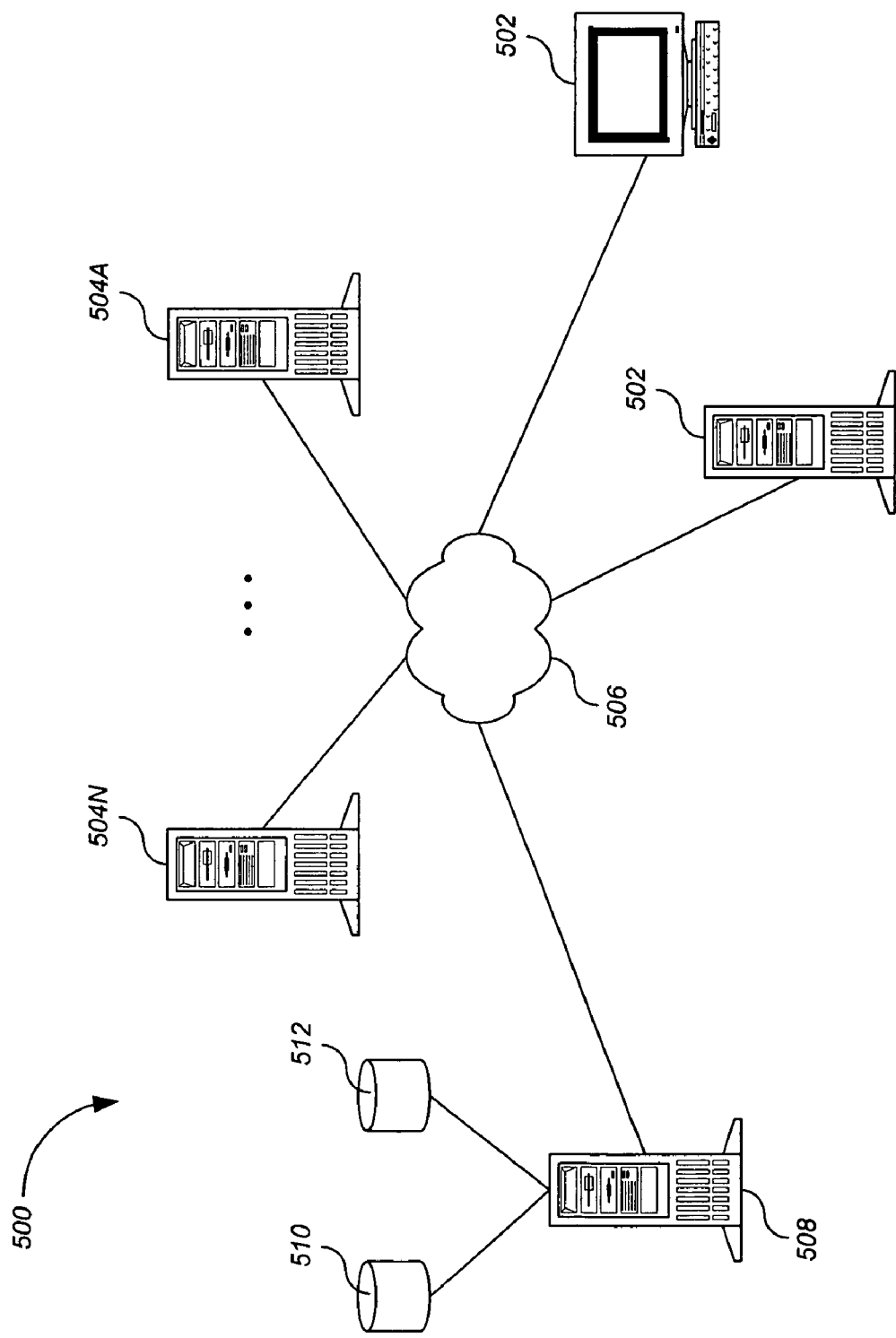
FIG. 5 shows an implementation of an authentication system in which the client accesses the secure server using a delegate server.

An implementation of an authentication system 500 in which the client accesses the secure server using a delegate server is described with reference to FIG. 5. A delegate server is a server that acts on behalf of a client to access a secure server. Delegate servers include portal servers and the like. A client 502 permits users to access a network 506, such as the Internet, an enterprise network, or any other kind of network or combination of networks. Any number of clients 502 can be connected to network 506. A plurality of secure servers 504A through 504N are connected to network 506. A secure server 504 is referred to as "secure" because it requires that a client 502 be authenticated before access to the secure server 504 is granted to that client 502. Also connected to network 506 is an authentication server 508, which can authenticate clients 502 as required by secure servers 504. In one implementation, the connections among the servers and clients are implemented as secure sockets layer (SSL) connections.

A directory 510 and a credentials cache 512 are connected to authentication server 508. Each of directory 510 and credentials cache 512 can be implemented as a database, a table stored in a memory, or the like.

Figure 6:
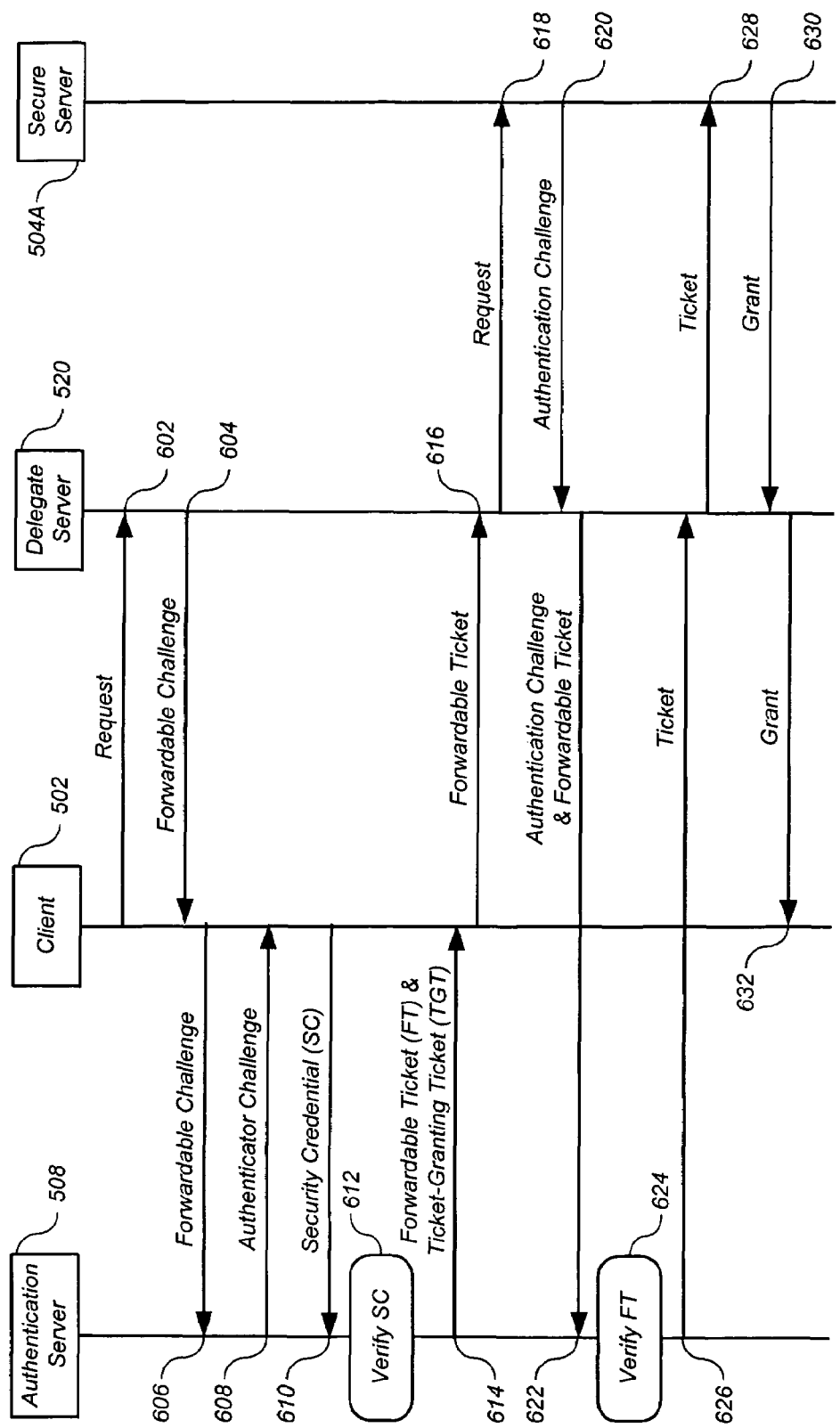
FIG. 6 shows an operation of the authentication system of FIG. 5 where a client is required to provide a security credential of the user to access a secure server.

An operation of authentication system 500 where client 502 is required to provide a security credential of the user to access a secure server 504A is described with reference to FIG. 6. A user of client 502 desires access to content, data, services, resources, or the like, hosted by a secure server 504A. Therefore the user issues a demand to client 502 for access to secure server 504A. The demand can take the form of a command typed into a keyboard, a click of a mouse, or the like. In response to the demand, client 502 sends a request message (act 602) to delegate server 520 requesting access to secure server 504A. In response, delegate server 520 causes client 502 to be authenticated. Delegate server 520 sends a forwardable challenge to client 502 (act 604), which client 502 redirects to an authentication server 508 (act 606), without user intervention. Delegate server 520 can choose a particular authentication server 508 according to any criteria, such as a preference specified by the user of client 502.

The forwardable challenge includes a flag requesting delegation authority. When authentication server 508 finds this flag in the forwardable challenge, it uses a server identity field in the forwardable challenge to look up delegate server 520 in a list of servers allowed to act as delegates. This list may be configured as a global policy on authentication server 508 or on a per-user basis, depending on the implementation; but the default policy is to deny delegation requests unless a server has been explicitly granted access. If the lookup fails, authentication server 508 returns a ticket, allowing delegate server 520 to identify but not impersonate client 502.

In this example, client 502 has not yet provided a security credential to an authentication server 508. Therefore authentication server 508 sends an authenticator challenge message to client 502 (act 608). In response, client 502 sends a security credential message to authentication server 508 (act 610). The security credential message includes at least one security credential belonging to the user of client 502. Authentication server 508 can use any credentials that can be transmitted across HTTP to authenticate client 502, including passwords, challenge-response, digital certificates, tokens, smart cards, or biometrics, or any combination thereof, and can authenticate against any backend directory via LDAP, NTLM, or another protocol.

Authentication server 508 authenticates client 502 (act 612). Directory 510 contains an entry for each user that is authorized to access secure server 504A. Each entry contains one or more security credentials belonging to each authorized user. Authentication server 508 authenticates client 502 by verifying the security credentials, for example, by comparing the security credential received in the security credential message to the security credentials in directory 510. Upon a successful authentication, authentication server 508 sends a message to client 502 containing a forwardable ticket and a ticket-granting ticket (act 614). Client 102 retains the TGT as a cookie, but sends the forwardable ticket to authentication server 508, which redirects the forwardable ticket to delegate server 520 (act 616), without user intervention.

Figure 8:
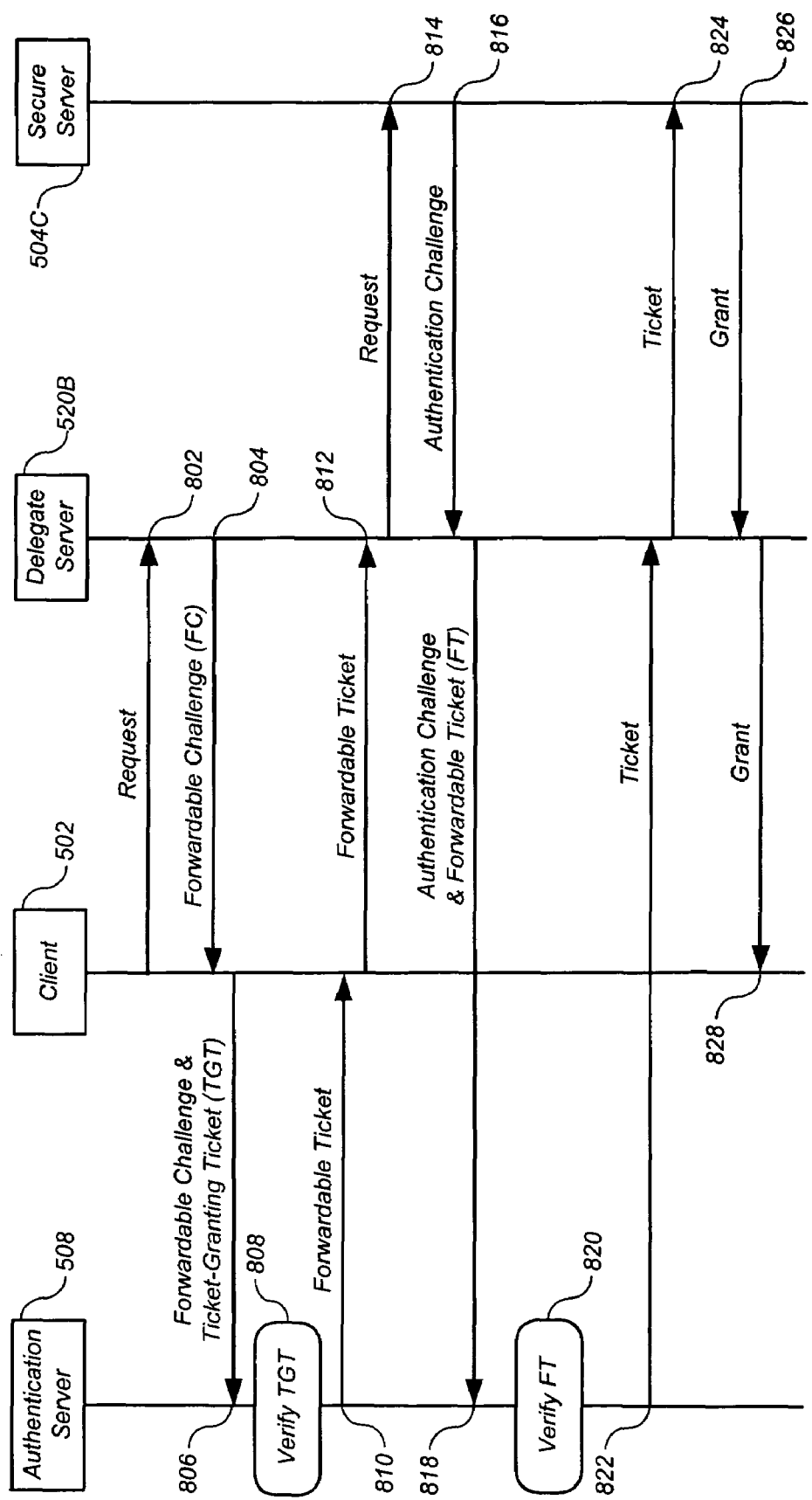
FIG. 8 shows an operation of the authentication system of FIG. 5 where the client uses a different delegate server to access a secure server without providing a security credential of the user.

The ticket-granting ticket (TGT) enables client 502 to obtain forwardable tickets for delegate servers other than delegate server 520 without again sending security credentials to authentication server 508, as discussed below with respect to FIG. 8. Authentication server 508 also programmatically adds the TGT to its own cookie database.

The forwardable ticket enables delegate server 520 to obtain tickets to secure servers other than secure server 504A on the behalf of client 502. A forwardable ticket contains the same information as a standard ticket, but also includes a ticket-granting ticket that the delegate will pass to the authentication server when requesting tickets on behalf of the client. This TGT could be a simple copy of the TGT retained by the client, or a separate TGT with additional restrictions such as a shorter expiration time.

Delegate server 520 now sends a request for access or content to secure server 504A (act 618). In response, secure server 504A sends an authentication challenge message (act 620) to delegate server 520 requesting authentication of client 502. In one implementation, the authentication challenge includes the current time, the identity of secure server 504A, the IP address of delegate server 520 as seen from secure server 504A, a random number, and the identity of an authentication server that is trusted by secure server 504A (in this case, the identity of authentication server 508).

Delegate server 520 sends the authentication challenge to authentication server 508, and includes the TGT, without user intervention (act 622). Authentication server 508 authenticates client 502 by verifying the forwardable ticket (act 624) in a manner similar to the verification of the TGT describe above.

Authentication server 508 then sends a ticket for secure server 504A to delegate server 520 (act 626) after applying a digital signature to the ticket using a private key of authentication server 508. The ticket contains the information from the authentication challenge plus the URL of authentication server 508, a user ID unique to authentication server 508, and an expiration date generated by adding a configurable timeout period to the time found in the challenge (to prevent clock synchronization problems). Authentication server 508 then applies a digital signature to the ticket using a private key from a public-private key pair. The challenge and/or the ticket may be too long for reliable support in the query string. If so, the same can be accomplished by other mechanisms such as an automatic form post.

Delegate server 520 sends the ticket to secure server 504A (act 628). Secure server 504A looks up authentication server 508 in a table of trusted authentication servers using the URL of the latter as the key. Finding an entry, secure server 504A retrieves the public key corresponding to the private key used to apply the digital signature to the ticket, uses the public key to verify the digital signature, and grants access to client 502 (that is, establishes the session). Secure server 504A can maintain the identity of the client by any of several conventional mechanisms. For example, secure server 504A can choose to store the ticket as a cookie and revalidate it on every request, or can use a traditional session cookie. Preferably SSL is used to prevent session stealing.

In one implementation, the ticket includes at least part of the authentication challenge sent by secure server 504A. According to this implementation, secure server 504A verifies the presence of that part of the ticket before granting access to client 502.

Upon verifying the digital signature, secure server 504A grants access to 202 by sending a grant message to delegate server 520 (act 630), which delegate server 520 redirects to client 502 (act 632). In one corporate portal implementation in which client 502 has requested content from secure server 504A, secure server 504A sends the content to delegate server 520, which assembles the content with any other content requested by client 502, and delivers the assembled content to client 502.

Figure 7:
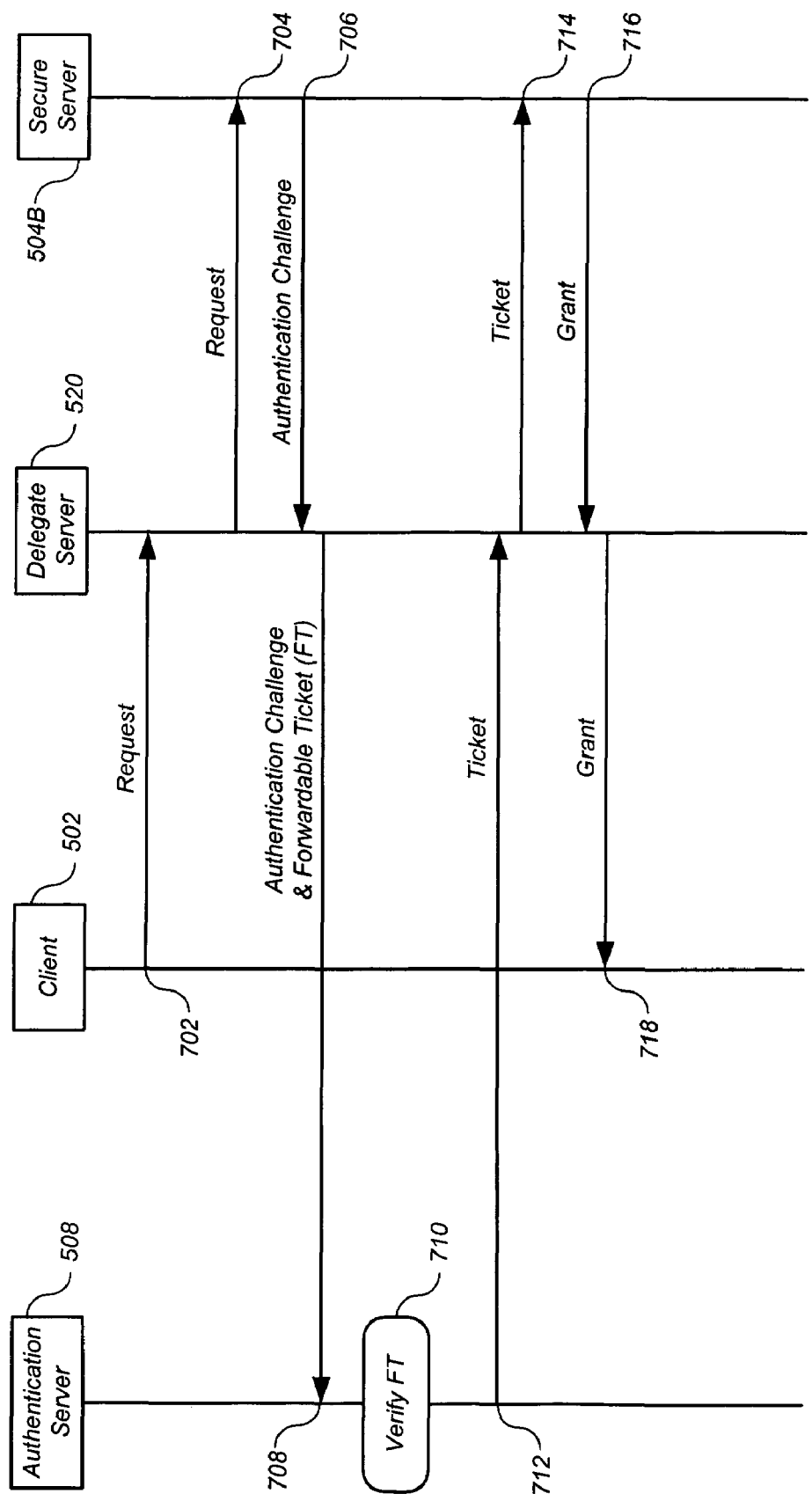
FIG. 7 shows an operation of the authentication system of FIG. 5 where the client accesses a different secure server without again providing a security credential of the user.

An operation of authentication system 500 where client 502 accesses a different secure server 504B without again providing a security credential of the user is described with reference to FIG. 7. In this example, this operation follows the operation described with respect to FIG. 6. Client 502 sends a request for access to a different secure server 504B to delegate server 520 (act 702), which sends a request for access to secure server 504B (act 704). Secure server 504B responds with an authentication challenge (act 706). Delegate server 520 sends the authentication challenge to authentication server 508, and includes the forwardable ticket previously issued by authentication server 508 (act 708).

Authentication server 508 authenticates client 502 by verifying the forwardable ticket (act 710). Authentication server 508 then sends a ticket for secure server 504 to delegate server 520 (act 712) after applying a digital signature to the ticket using a private key of authentication server 508. Delegate server 520 sends the ticket to secure server 504B (act 714). Upon verifying the digital signature, secure server 504 grants access to 502 by sending a grant message to delegate server 520 (act 716), which delegate server 520 sends to 502 (act 718). In one corporate portal implementation in which 502 has requested content from secure server 504B, secure server 504B sends the content to delegate server 520, which assembles the content with any other content requested by 502, and delivers the assembled content to 502.

An operation of authentication system 500 where client 502 uses a different delegate server 520B to access a secure server 504C without providing a security credential of the user is described with reference to FIG. 8. In this example, this operation follows the operation described with respect to FIG. 6. A user of client 502 desires access to content, data, services, resources, or the like, hosted by a secure server 504C. Therefore the user issues a demand to client 502 for access to secure server 504C. The demand can take the form of a command typed into a keyboard, a click of a mouse, or the like. In response to the demand, client 502 sends a request message (act 802) to delegate server 520B requesting access to secure server 504C. In response, delegate server 520B causes client 502 to be authenticated. Delegate server 520B sends a forwardable challenge to client 502 (act 804), which client 502 redirects to an authentication server 508 (act 806), without user intervention. Client 502 includes the ticket-granting ticket received previously from delegate server 520.

The forwardable challenge includes a flag requesting delegation authority. When authentication server 508 finds this flag in the forwardable challenge, it uses a server identity field in the forwardable challenge to look up delegate server 520B in a list of servers allowed to act as delegates. This list may be configured as a global policy on an authentication server 508 or on a per-user basis, depending on the implementation; but the default policy is to deny delegation requests unless a server has been explicitly granted access. If the lookup fails, authentication server 508 returns a ticket, allowing delegate server 520B to identify but not impersonate client 502.

Authentication server 508 authenticates client 502 by verifying the TGT (act 808). In one implementation the TGT is a cookie containing a random number which serves as a lookup into credentials cache 512. This cookie can be set as a session cookie or a persistent cookie according to configurable parameters of the authenticator, and is preferably set with the secure flag and the most restrictive path possible such that it is only sent via SSL and only to authentication server 508. In addition, authentication server 508 keeps and enforces its own expiration date within credentials cache 512 regardless of how long client 502 keeps the cookie. When the cookie has expired, authentication server 508 again challenges client 502 to present valid credentials. Authentication server 508 can enforce additional restrictions on the use of the TGT, such as checking that all requests using a particular TGT come from the same IP address.

Upon a successful authentication, authentication server 508 sends a message to client 502 containing a forwardable ticket (act 810). Client 502 redirects the forwardable ticket to delegate server 520B (act 812), without user intervention. The forwardable ticket enables delegate server 520B to obtain tickets to secure servers 504 on the behalf of client 502.

Delegate server 520B now sends a request for access or content to secure server 504C (act 814). In response, secure server 504C sends an authentication challenge message (act 816) to delegate server 520B requesting authentication of client 502. In one implementation, the authentication challenge includes the current time, the identity of secure server 504C, a random number, and the identity of an authentication server that is trusted by secure server 504C (in this case, the identity of authentication server 508).

Delegate server 520B sends the authentication challenge to authentication server 508, and includes the forwardable ticket previously issued by authentication server 508 (act 818). Authentication server 508 authenticates client 502 by verifying the forwardable ticket (act 820). Authentication server 508 then sends a ticket for secure server 504C to delegate server 520 (act 822) after applying a digital signature to the ticket using a private key of authentication server 508. Delegate server 520B sends the ticket to secure server 504C (act 824). Upon verifying the digital signature, secure server 504C grants access to 502 by sending a grant message to delegate server 520B (act 826), which delegate server 520B sends to client 502 (act 828). In one corporate portal implementation in which client 502 has requested content from secure server 504C, secure server 504C sends the content to delegate server 520, which assembles the content with any other content requested by client 502, and delivers the assembled content to client 502.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of embodiments of the invention have been described. Nevertheless, it will be understood that various modifications can be made without departing from the spirit and scope of the invention. Many variations of the above operations are possible. For example, client 502 could begin an operation with one authentication server and complete a subsequent operation with a different authentication server.

A secure server can require authentication from multiple authentication servers. An authentication server can in turn require authentication by a second authentication server. Any of the various servers can be located on the same physical computer, where the "network" is the local loopback adapter. A secure server could give the user a choice of authentication servers to use, or try several until the authentication succeeds. A delegate server can request resources from multiple secure servers using one or more authentication servers. A delegation server can request a forwardable ticket and delegate to a second delegation server.

Accordingly, other embodiments are within the scope of the following claims.

What is claimed is:

1. A method for use in a Web server for obtaining content from a secure server, in response to a request from a client for the content, without further intervention by the user of the client, the method comprising:
- sending a request for the content to the secure server;
- receiving an authentication challenge from the secure server in response to the request;
- sending a forwardable ticket to an authentication server trusted by the secure server, the forwardable ticket previously sent to the Web server by the authentication server based on a successful authentication of the client by the authentication server;
- receiving from the authentication server a ticket having a digital signature applied using a private key of a public-private key pair of the authentication server; and
- sending the ticket to the secure server, wherein the secure server, upon verifying the digital signature using a public key of said private-public key pair corresponding to the private key of the authentication server, provides the requested content; and wherein
- communications with the client employ a generic application-layer network protocol.

2. The method of claim 1, further comprising:
- sending a forwardable challenge to the client in response to the request from the client, the forwardable challenge including the identity of an authentication server trusted by the Web server, wherein the authentication server authenticates the client and generates the forwardable ticket based on authenticating the client; and
- receiving the forwardable ticket from the authentication server.

3. A method for use in an authentication server for obtaining content from a secure server for a client that has issued a request for the content from the secure server, without further intervention by the user of the client, the method comprising:
- receiving a forwardable ticket sent by a Web server in response to a challenge issued by the secure server in response to the request, the forwardable ticket previously sent to the Web server by the authentication server based on a successful authentication of the client by the authentication server;
- generating a ticket having a digital signature applied using a private key of a public-private key pair of the authentication server; and wherein
- the secure server, upon verifying the digital signature using a public key of said public-private key pair corresponding to the private key of the authentication server, provides the requested content; and wherein
- communications with the client employ a generic application-layer network protocol.

4. The method of claim 3, further comprising:
- authenticating the client based on a previous successful authentication of the client before generating the ticket.

5. The method of claim 4 wherein authenticating comprises: verifying the forwardable ticket.

6. The method of claim 3, further comprising:
- receiving a security credential from the client, the security credential belonging to a user of the client;
- verifying the security credential; and
- generating the forwardable ticket when verifying the client is successful.

7. The method of claim 3, further comprising:
- receiving a ticket-granting ticket from the client, the ticket-granting ticket sent by a second authentication server to the client based on the previous successful authentication;
- generating the forwardable ticket; and
- sending the forwardable ticket to the client, whereupon the client sends the forwardable ticket to the Web server.

8. The method of claim 7, further comprising:
- receiving a security credential from the client, the security credential belonging to a user of the client;
- verifying the security credential; and
- generating the ticket-granting ticket when the verification is successful.

9. A method for use in a Web server for obtaining access to a secure server, in response to a request from a client for the access, without further intervention by the user of the client, the method comprising:
- sending a request for the content to the secure server;
- receiving an authentication challenge from the secure server in response to the request;
- sending a forwardable ticket to an authentication server trusted by the secure server, the forwardable ticket previously sent to the Web server by the authentication server based on a successful authentication of the client by the authentication server;
- receiving from the authentication server a ticket having a digital signature applied using a private key of a public-private key pair of the authentication server; and
- sending the ticket to the secure server, wherein the secure server, upon verifying the digital signature using a public key of said public-private key pair corresponding to the private key of the authentication server, grants the access; and wherein communications with the client employ a generic application-layer network protocol.

10. The method of claim 9, further comprising:
- sending a forwardable challenge to the client in response to the request from the client, the forwardable challenge including the identity of an authentication server trusted by the Web server, wherein the authentication server authenticates the client and generates the forwardable ticket based on authenticating the client; and
- receiving the forwardable ticket from the authentication server.

11. A method for use in an authentication server for obtaining access to a secure server for a client that has issued a request for the access, without further intervention by the user of the client, the method comprising: receiving a forwardable ticket sent by a Web server in response to a challenge issued by the secure server in response to the request, the forward able ticket previously sent to the Web server by the authentication server based on a successful authentication of the client by the authentication server;
- generating a ticket having a digital signature applied using a private key of a public-private key pair of the authentication server; and wherein
- the secure server, upon verifying the digital signature using a public key of said public-private key pair corresponding to the private key of the authentication server, grants the access; and wherein
- communications with the client employ a generic application-layer network protocol.

12. The method of claim 11, further comprising:
- authenticating the client based on a previous successful authentication of the client before generating the ticket.

13. The method of claim 12, wherein authenticating comprises:
- verifying the forwardable ticket.

14. The method of claim 11, further comprising:
- receiving a security credential from the client, the security credential belonging to a user of the client;

verifying the security credential; and
generating the forwardable ticket when verifying the client is successful.

15. The method of claim 11, further comprising:
receiving a ticket-granting ticket from the client, the ticket-granting ticket sent by a second authentication server to the client based on the previous successful authentication;
generating the forwardable ticket; and
sending the forwardable ticket to the client, whereupon the client sends the forwardable ticket to the Web server.

16. The method of claim 15, further comprising:
receiving a security credential from the client, the security credential belonging to a user of the client;
verifying the security credential; and
generating the ticket-granting ticket when the verification is successful.

17. Computer-readable media embodying tangible digital code executable by a computer to perform a method for use in a Web server for obtaining content from a secure server, in response to a request from a client for the content, without further intervention by the user of the client, the method comprising:
sending a request for the content to the secure server;
receiving an authentication challenge from the secure server in response to the request;
sending a forwardable ticket to an authentication server trusted by the secure server, the forwardable ticket previously sent to the Web server by the authentication server based on a successful authentication of the client by the authentication server;
receiving from the authentication server a ticket having a digital signature applied using a private key of a public-private key pair of the authentication server; and
sending the ticket to the secure server, wherein the secure server, upon verifying the digital signature using a public key of said public-private key pair corresponding to the private key of the authentication server, provides the requested content; and wherein
communications with the client employ a generic application-layer network protocol.

18. The media of claim 17, wherein the method further comprises:
sending a forwardable challenge to the client in response to the request from the client, the forwardable challenge including the identity of an authentication server trusted by the Web server, wherein the authentication server authenticates the client and generates the forwardable ticket based on authenticating the client; and
receiving the forwardable ticket from the authentication server.

19. Computer-readable media embodying tangible digital code executable by a computer to perform a method for use in an authentication server for obtaining content from a secure server for a client that has issued a request for the content from the secure server, without further intervention by the user of the client, the method comprising:
receiving a forwardable ticket sent by a Web server in response to a challenge issued by the secure server in response to the request, the forwardable ticket previously sent to the Web server by the authentication server based on a successful authentication of the client by the authentication server;
generating a ticket having a digital signature applied using a private key of a public-private key pair of the authentication server; and wherein the secure server, upon verifying the digital signature using a public key of said public-private key pair corresponding to the private key of the authentication server, provides the requested content; and wherein
communications with the client employ a generic application-layer network protocol.

20. The media of claim 19, wherein the method further comprises:
authenticating the client based on a previous successful authentication of the client before generating the ticket.

21. The media of claim 20, wherein authenticating comprises:
verifying the forwardable ticket.

22. The media of claim 19, wherein the method further comprises:
receiving a security credential from the client, the security credential belonging to a user of the client;
verifying the security credential; and
generating the forwardable ticket when verifying the client is successful.

23. The media of claim 19, wherein the method further comprises:
receiving a ticket-granting ticket from the client, the ticket-granting ticket sent by a second authentication server to the client based on the previous successful authentication;
generating the forwardable ticket; and
sending the forwardable ticket to the client, whereupon the client sends the forwardable ticket to the Web server.

24. The media of claim 23, wherein the method further comprises:
receiving a security credential from the client, the security credential belonging to a user of the client;
verifying the security credential; and
generating the ticket-granting ticket when the verification is successful.

25. Computer-readable media embodying tangible digital code executable by a computer to perform a method for use in a Web server for obtaining access to a secure server, in response to a request from a client for the access, without further intervention by the user of the client, the method comprising:
sending a request for the content to the secure server;
receiving an authentication challenge from the secure server in response to the request;
sending a forwardable ticket to an authentication server trusted by the secure server, the forwardable ticket previously sent to the Web server by the authentication server based on a successful authentication of the client by the authentication server;
receiving from the authentication server a ticket having a digital signature applied using a private key of a public-private key pair of the authentication server; and
sending the ticket to the secure server, wherein the secure server, upon verifying the digital signature using a public key of said public-private key pair corresponding to the private key of the authentication server, grants the access; and wherein
communications with the client employ a generic application-layer network protocol.

26. The media of claim 25, wherein the method further comprises:
sending a forwardable challenge to the client in response to the request from the client, the forwardable challenge including the identity of an authentication server trusted by the Web server, wherein the authentication server authenticates the client and generates the forwardable ticket based on authenticating the client; and
receiving the forwardable ticket from the authentication server.

27. Computer-readable media embodying tangible digital code executable by a computer to perform a method for use in an authentication server for obtaining access to a secure server for a client that has issued a request for the access, without further intervention by the user of the client, the method comprising:
receiving a forwardable ticket sent by a Web server in response to a challenge issued by the secure server in response to the request, the forwardable ticket previously sent to the Web server by the authentication server based on a successful authentication of the client by the authentication server;
generating a ticket having a digital signature applied using a private key of a public-private key pair of the authentication server; and wherein
the secure server, upon verifying the digital signature using a public key of said public-private key pair corresponding to the private key of the authentication server, grants the access; and wherein
communications with the client employ a generic application-layer network protocol.

28. The media of claim 27, wherein the method further comprises:
authenticating the client based on a previous successful authentication of the client before generating the ticket.

29. The media of claim 28, wherein authenticating comprises: verifying the forwardable ticket.

30. The media of claim 27, wherein the method further comprises:
receiving a security credential from the client, the security credential belonging to a user of the client;
verifying the security credential; and
generating the forwardable ticket when verifying the client is successful.

31. The media of claim 27, wherein the method further comprises:
receiving a ticket-granting ticket from the client, the ticket-granting ticket sent by a second authentication server to the client based on the previous successful authentication;
generating the forwardable ticket; and
sending the forwardable ticket to the client, whereupon the client sends the forwardable ticket to the Web server.

32. The media of claim 31, wherein the method further comprises:
receiving a security credential from the client, the security credential belonging to a user of the client;
verifying the security credential; and
generating the ticket-granting ticket when the verification is successful.

33. An apparatus for use in a Web server for obtaining content from a secure server, in response to a request from a client for the content, without further intervention by the user of the client, the apparatus comprising:
means for sending a request for the content to the secure server; means for receiving an authentication challenge from the secure server in response to the request;
means for sending a forwardable ticket to an authentication server trusted by the secure server, the forwardable ticket previously sent to the Web server by the authentication server based on a successful authentication of the client by the authentication server;
means for receiving from the authentication server a ticket having a digital signature applied using a private key of a public-private key pair of the authentication server; and
means for sending the ticket to the secure server, wherein the secure server, upon verifying the digital signature using a public key of said public-private key pair corresponding to the private key of the authentication server, provides the requested content; and wherein
communications with the client employ a generic application-layer network protocol.

34. The apparatus of claim 33, further comprising:
means for sending a forwardable challenge to the client in response to the request from the client, the forwardable challenge including the identity of an authentication server trusted by the Web server, wherein the authentication server authenticates the client and generates the forwardable ticket based on authenticating the client; and
means for receiving the forwardable ticket from the authentication server.

35. An apparatus for use in an authentication server for obtaining content from a secure server for a client that has issued a request for the content from the secure server, without further intervention by the user of the client, the apparatus comprising:
means for receiving a forwardable ticket sent by a Web server in response to a challenge issued by the secure server in response to the request, the forwardable ticket previously sent to the Web server by the authentication server based on a successful authentication of the client by the authentication server;
means for generating a ticket having a digital signature applied using a private key of a public-private key pair of the authentication server; and wherein
the secure server, upon verifying the digital signature using a public key of said public-private key pair corresponding to the private key of the authentication server, provides the requested content; and wherein
communications with the client employ a generic application-layer network protocol.

36. The apparatus of claim 35, further comprising:
means for authenticating the client based on a previous successful authentication of the client before generating the ticket.

37. The apparatus of claim 36, wherein means for authenticating comprises:
means for verifying the forwardable ticket.

38. The apparatus of claim 35, further comprising:
means for receiving a security credential from the client, the security credential belonging to a user of the client;
means for verifying the security credential; and
means for generating the forwardable ticket when verifying the client is successful.

39. The apparatus of claim 35, further comprising:
means for receiving a ticket-granting ticket from the client, the ticket-granting ticket sent by a second authentication server to the client based on the previous successful authentication;
means for generating the forwardable ticket; and
means for sending the forwardable ticket to the client, whereupon the client sends the forwardable ticket to the Web server.

40. The apparatus of claim 39, further comprising:
means for receiving a security credential from the client, the security credential belonging to a user of the client;

means for verifying the security credential; and means for generating the ticket-granting ticket when the verification is successful.

41. An apparatus for use in a Web server for obtaining access to a secure server, in response to a request from a client for the access, without further intervention by the user of the client, the apparatus comprising:
means for sending a request for the content to the secure sewer;
means for receiving an authentication challenge from the secure server in response to the request;
means for sending a forwardable ticket to an authentication server trusted by the secure server, the forwardable ticket previously sent to the Web server by the authentication server based on a successful authentication of the client by the authentication server;
means for receiving from the authentication server a ticket having a digital signature applied using a private key of a public-private key pair of the authentication server; and
means for sending the ticket to the secure server, wherein the secure server, upon verifying the digital signature using a public key of said public-private key pair corresponding to the private key of the authentication server, grants the access; and wherein
communications with the client employ a generic application-layer network protocol.

42. The apparatus of claim 41, further comprising:
means for sending a forwardable challenge to the client in response to the request from the client, the forwardable challenge including the identity of an authentication server trusted by the Web server, wherein the authentication server authenticates the client and generates the forwardable ticket based on authenticating the client; and
means for receiving the forwardable ticket from the authentication server.

43. An apparatus for use in an authentication server for obtaining access to a secure server for a client that has issued a request for the access, without further intervention by the user of the client, the apparatus comprising:
means for receiving a forwardable ticket sent by a Web server in response to a challenge issued by the secure server in response to the request, the forwardable ticket previously sent to the Web server by the authentication server based on a successful authentication of the client by the authentication server;
means for generating a ticket having a digital signature applied using a private key of a public-private key pair of the authentication server; and wherein
the secure server, upon verifying the digital signature using a public key of said public-private key pair corresponding to the private key of the authentication server, grants the access; and wherein
communications with the client employ a generic application-layer network protocol.

44. The apparatus of claim 43, further comprising:
means for authenticating the client based on a previous successful authentication of the client before generating the ticket.

45. The apparatus of claim 44, wherein means for authenticating comprises:
means for verifying the forwardable ticket.

46. The apparatus of claim 43, further comprising:
means for receiving a security credential from the client, the security credential belonging to a user of the client;
means for verifying the security credential; and
means for generating the forwardable ticket when verifying the client is successful.

47. The apparatus of claim 43, further comprising:
means for receiving a ticket-granting ticket from the client, the ticket-granting ticket sent by a second authentication server to the client based on the previous successful authentication;
means for generating the forwardable ticket; and
sending the forwardable ticket to the client, whereupon the client sends the forwardable ticket to the Web server.

48. The apparatus of claim 47, further comprising:
means for receiving a security credential from the client, the security credential belonging to a user of the client;
means for verifying the security credential; and
means for generating the ticket-granting ticket when the verification is successful.

49. At least one computer including a processor and one or more tangible digital storage media for programming the processor to execute a process for obtaining content from a secure server, in response to a request from a client for the content, without further intervention by the user of the client, the process comprising:
sending a request for the content to the secure server;
receiving an authentication challenge from the secure server in response to the request;
sending a forwardable ticket to an authentication server trusted by the secure server, the forwardable ticket previously sent to the Web server by the authentication server based on a successful authentication of the client by the authentication server;
receiving from the authentication server a ticket having a digital signature applied using a private key of a public-private key pair of the authentication server; and
sending the ticket to the secure server, wherein the secure server, upon verifying the digital signature using a public key of said public-private key pair corresponding to the private key of the authentication server, provides the requested content; and wherein
communications with the client employ a generic application-layer network protocol.

50. The computer of claim 49, wherein the process further comprises:
sending a forwardable challenge to the client in response to the request from the client, the forwardable challenge including the identity of an authentication server trusted by the Web server, wherein the authentication server authenticates the client and generates the forwardable ticket based on authenticating the client; and
receiving the forwardable ticket from the authentication server.

51. At least one computer including a processor and one or more tangible digital storage media for programming the processor to execute a process for obtaining content from a secure server for a client that has issued a request for the content from the secure server, without further intervention by the user of the client, the process comprising:
receiving a forwardable ticket sent by a Web server in response to a challenge issued by the secure server in response to the request, the forwardable ticket previously sent to the Web server by the authentication server based on a successful authentication of the client by the authentication server;
generating a ticket having a digital signature applied using a private key of a public-private key pair of the authentication server; and wherein the secure server, upon verifying the digital signature using a public key of said public-private key pair corresponding to the private key of the authentication server, provides the requested content; and wherein communications with the client employ a generic application-layer network protocol.

52. The computer of claim 51, wherein the process further comprises:
authenticating the client based on a previous successful authentication of the client before generating the ticket.

53. The computer of claim 52, wherein authenticating comprises:
verifying the forwardable ticket.

54. The computer of claim 51, wherein the process further comprises:
receiving a security credential from the client, the security credential belonging to a user of the client;
verifying the security credential; and
generating the forwardable ticket when verifying the client is successful.

55. The computer of claim 51, wherein the process further comprises:
receiving a ticket-granting ticket from the client, the ticket-granting ticket sent by a second authentication server to the client based on the previous successful authentication;
generating the forwardable ticket; and
sending the forwardable ticket to the client, whereupon the client sends the forwardable ticket to the Web server.

56. The computer of claim 55, wherein the process further comprises:
receiving a security credential from the client, the security credential belonging to a user of the client;
verifying the security credential; and
generating the ticket-granting ticket when the verification is successful.

57. At least one computer including a processor and one or more tangible digital storage media for programming the processor to execute a process for obtaining access to a secure server, in response to a request from a client for the access, without further intervention by the user of the client, the process comprising:
sending a request for the content to the secure server;
receiving an authentication challenge from the secure server in response to the request;
sending a forwardable ticket to an authentication server trusted by the secure server, the forwardable ticket previously sent to the Web server by the authentication server based on a successful authentication of the client by the authentication server
receiving from the authentication server a ticket having a digital signature applied using a private key of a public-private key pair of the authentication server; and
sending the ticket to the secure server, wherein the secure server, upon verifying the digital signature using a public key of a public-private key pair corresponding to the private key of the authentication server, grants the access; and wherein
communications with the client employ a generic application-layer network protocol.

58. The computer of claim 57, wherein the process further comprises:
sending a forwardable challenge to the client in response to the request from the client, the forwardable challenge including the identity of an authentication server trusted by the Web server, wherein the authentication server authenticates the client and generates the forwardable ticket based on authenticating the client; and
receiving the forwardable ticket from the authentication server.

59. At least one computer including a processor and one or more tangible digital storage media for programming the processor to execute a process for obtaining access to a secure server for a client that has issued a request for the access, without further intervention by the user of the client, the process comprising:
receiving a forwardable ticket sent by a Web server in response to a challenge issued by the secure server in response to the request, the forwardable ticket previously sent to the Web server by the authentication server based on a successful authentication of the client by the authentication server;
generating a ticket having a digital signature applied using a private key of a public-private key pair of the authentication server; and wherein
the secure server, upon verifying the digital signature using a public key of a public-private key pair corresponding to the private key of the authentication server, grants the access; and wherein
communications with the client employ a generic application-layer network protocol.

60. The computer of claim 59, wherein the process further comprises:
authenticating the client based on a previous successful authentication of the client before generating the ticket.

61. The computer of claim 60, wherein authenticating comprises:
verifying the forwardable ticket.

62. The computer of claim 59, wherein the process further comprises:
receiving a security credential from the client, the security credential belonging to a user of the client;
verifying the security credential; and
generating the forwardable ticket when verifying the client is successful.

63. The computer of claim 59, wherein the process further comprises:
receiving a ticket-granting ticket from the client, the ticket-granting ticket sent by a second authentication server to the client based on the previous successful authentication;
generating the forwardable ticket; and
sending the forwardable ticket to the client, whereupon the client sends the forwardable ticket to the Web server.

64. The computer of claim 63 wherein the process further comprises:
receiving a security credential from the client, the security credential belonging to a user of the client;
verifying the security credential; and
generating the ticket-granting ticket when the verification is successful.

* * * * *